United States Patent
Liu et al.

(10) Patent No.: US 9,720,813 B2
(45) Date of Patent: Aug. 1, 2017

(54) METHOD AND APPARATUS FOR RECOMMENDING REGRESSION TESTS

(71) Applicant: CA, Inc., New York, NY (US)

(72) Inventors: Kevin Liu, Beijing (CN); Tony Shen, Beijing (CN)

(73) Assignee: CA, Inc., New York, NY (US)

( * ) Notice: Subject to any disclaimer, the term of this patent is extended or adjusted under 35 U.S.C. 154(b) by 20 days.

(21) Appl. No.: 14/825,285

(22) Filed: Aug. 13, 2015

(65) Prior Publication Data
US 2017/0046245 A1  Feb. 16, 2017

(51) Int. Cl.
*G06F 11/36* (2006.01)

(52) U.S. Cl.
CPC ........ *G06F 11/368* (2013.01); *G06F 11/3688* (2013.01)

(58) Field of Classification Search
CPC .......................... G06F 11/3688; G06F 11/368
See application file for complete search history.

(56) References Cited

U.S. PATENT DOCUMENTS

| | | | | |
|---|---|---|---|---|
| 9,201,768 | B1* | 12/2015 | Alon | G06F 11/3672 |
| 2008/0126867 | A1* | 5/2008 | Pandarinathan | G06F 11/3688 714/37 |
| 2014/0331206 | A1* | 11/2014 | Abraham | G06F 11/3676 717/124 |

OTHER PUBLICATIONS

Brand, L., "An Introduction to Regression Testing", Simula Research Laboratory, 2011, pp. 1-39.

* cited by examiner

*Primary Examiner* — Viva Miller
(74) *Attorney, Agent, or Firm* — Coats & Bennett, PLLC

(57) ABSTRACT

Information associated with tests performed on an application program is captured and stored in memory. This information is then used to recommend a set of regression tests to a user for use in regression testing the application. Particularly, responsive to being notified about a change in the program code, the device analyzes the stored information and recommends a selected set of regression tests to a user based on the results of that analysis. The recommended tests enable the user to adequately regression test the program code in the application program using an optimal number of test cases.

17 Claims, 7 Drawing Sheets

FIG. 4A — 100

| Case ID | Title | Action |
|---|---|---|
| 1 | Test creating a new user | Start |
| 2 | Test modifying a user | End |
| 3 | Test querying users | Start |
| 4 | Test deleting user | Start |

| Case ID | Title | Status | Start Time | End Time |
|---|---|---|---|---|
| 1 | Test creating a new user | Finished | 2014-11-19. 10:10:00 | 2014-11-19. 10:20:00 |
| 2 | Test modifying a user | In progress | 2014-11-19. 10:25:00 | |
| 3 | Test querying users | Not started | | |
| 4 | Test deleting user | Not started | | |

| Method ID | Case ID | Method | Parameters | Parent |
|---|---|---|---|---|
| 100 | 1 | com.ca.user.UserManager.add | Name:AAA@Password:AAA@ | |
| 101 | 1 | com.ca.persist.Persistmanager.persist | User(Name:AAA@Password:AAA@) | 100 |
| 102 | 2 | com.ca.user.UserManager.get | Name:AAA | |
| 103 | 2 | com.ca.persist.Persistmanager.query | User(Name:AAA) | 102 |
| 104 | 2 | com.ca.user.UserManager.update | ID:XXX@Name:BBB@Password:AAA@ | |
| 105 | 2 | com.ca.persist.Persistmanager.persist | User(ID:XXX@Name:BBB@Password:AAA@) | 104 |

132 / 134 / 136 / 138 / 140

METHOD AND APPARATUS FOR RECOMMENDING REGRESSION TESTS

BACKGROUND

The present disclosure relates to computer devices used for regression testing software applications.

Application programs comprise program code that is modified from time to time. Usually, the modifications are intended to introduce new features or to fix bugs in the code; however, after modification, it is typical for the developer and/or a testing team to re-test functionality of the application program to ensure that the features affected by the modified code operate properly. Such tests are known in the art as "regression tests."

Typically, the test team assigned to regression test a particular application program will select and execute "feature-specific" regression tests to test the operation of newly added or modified features. The people on the test team, however, are not always aware of the total impact that a given code modification has on the features of the application program. Therefore, whatever regression tests are selected by the test team using conventional practices may not sufficiently test all the features that are affected by the modified code. This may cause the test team to run more regression tests than are necessary, or in some cases, too few regression tests. Of course, running more tests than are necessary increases the cost of testing in terms of time and resources. On the other hand, running fewer tests than are necessary may mean that the modified application code is not adequately vetted, thereby possibly leading to an inferior product in which customers lose confidence.

BRIEF SUMMARY

The present disclosure provides a method, an apparatus, and a corresponding computer-readable storage medium for recommending a set of regression tests for use in regression testing an application program in which the program code has been modified.

In one embodiment, a computer-implemented method comprises determining, by a processing circuit of a control computer, that program code in an application program has been modified. The method also calls for the processing circuit determining a set of test cases for the application program. The determination is based on a mapping of the program code that has been modified to an execution trace of the application program stored in a memory circuit. The execution trace comprises a sequence of methods called by the program code prior to being modified, and was captured during a prior execution of the set of test cases. The method then calls for the processing circuit generating a list of recommended test cases for regression testing the application program from the set of test cases, and identifying the list of recommended test cases to a user.

In one embodiment, the present disclosure provides a computing device comprising a communications interface circuit and a processing circuit. The communications interface circuit is configured to communicate data with a remote computing device via a communications network. The processing circuit, however, is configured to determine that program code in an application program has been modified, and determine a set of test cases for the application program based on a mapping of the program code that has been modified to an execution trace of the application program stored in a memory circuit. The execution trace comprises a sequence of methods called by the program code prior to being modified, and was captured during a prior execution of the set of test cases. The processing circuit then generates a list of recommended test cases for regression testing the application program from the set of test cases, and identifies the list of recommended test cases to a user.

In another embodiment, the present disclosure provides a computer-readable storage medium comprising executable code stored thereon that, when executed by a processing circuit of a computing device, configures the computing device to determine that program code in an application program has been modified, and determine a set of test cases for the application program based on a mapping of the program code that has been modified to an execution trace of the application program stored in a memory circuit. The execution trace comprises a sequence of methods called by the program code prior to being modified, and was captured during a prior execution of the set of test cases. The executable code further configures the computing device to generate a list of recommended test cases for regression testing the application program from the set of test cases, and identify the list of recommended test cases to a user.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIGS. 4A-4C are tables illustrating types of information that is stored and utilized by a computing device configured according to one embodiment of the present disclosure.

DETAILED DESCRIPTION

Figure 1:
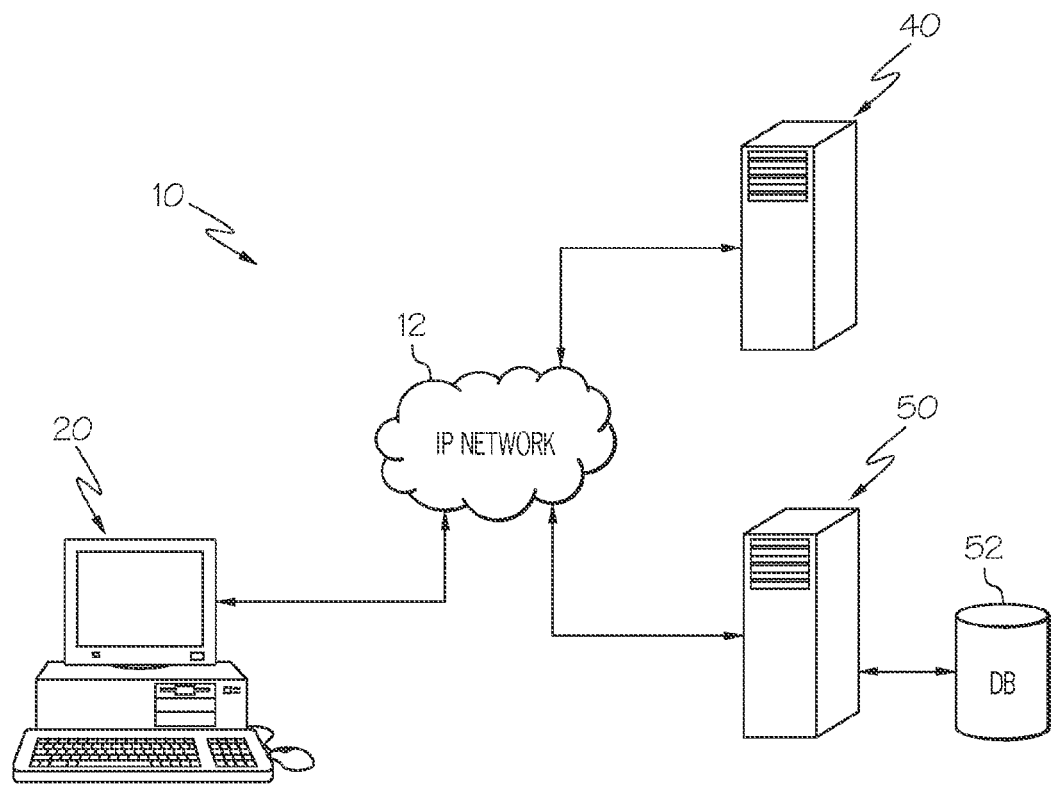
FIG. 1 is a block diagram illustrating some components of a communications network configured according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Pen, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Accordingly, embodiments of the present disclosure provide a computing device, a computer-readable storage medium, and a corresponding computer-implemented method for capturing information associated with tests performed on an application program, analyzing that information, and then recommending a selected set of regression tests to a user based on the results of that analysis. The set of regression tests are selected to enable the user to adequately regression test new or modified program code in the application using an optimal number of test cases. Thus, embodiments of the present disclosure reduce the time, effort, and amount of resources needed to perform regression testing while still ensuring that the modified code of a given application program is adequately tested.

In one embodiment, the application program under test comprises an agent module. During the initial (and subsequent) testing of the application program, the agent module intercepts test commands provided by the user (e.g., from a Graphical User Interface—GUI), notes the start and end times of the test, and tracks the names of the methods that are invoked during execution, as well as the sequence in which they are invoked in the application program. This sequence of methods is referred to herein as an "execution trace."

The agent module also captures and stores certain information and data that is related to the test performance and the execution trace. The information captured and stored by the agent module may be any type of information needed or desired; however, in one embodiment, the agent module captures and stores test case identifiers that identify the test cases performed, the start and end times of the tests, the resources used or accessed by the tests during execution, the names and parameters of the methods that are invoked during the tests (i.e., the execution trace), and the like. The method names may be reflected, for example, as Uniform Resource Identifiers (URIs).

Additionally, the information captured and stored by the agent module may identify the hierarchical architecture of the methods called by the application program during the test, thereby providing a clear indication of which methods are "parent" methods, and which are the "child" methods of those parent methods. Then, the agent module maps the URIs of each method to a corresponding test case identifier, and stores that mapping, along with the other information and data that is captured, in memory.

Thereafter, whenever the code of a method is altered, a "recommendation engine" is informed of the changes. In response, the recommendation engine retrieves and analyzes the stored information with respect to particular methods called by the modified application program, determines the corresponding test case identifiers for one or more test cases that were previously used to test the application program, and based on those identifiers, selects a set of test cases that may be used to regression test the modified code of the application program. The set of test cases may further be prioritized and optimized by the recommendation engine in accordance with various predetermined policies.

Turning now to the drawings, FIG. 1 is a block diagram illustrating some components of a computer network 10 configured according to one embodiment of the present disclosure. As those of ordinary skill in the art will readily appreciate, the components of network 10 seen in FIG. 1 are for illustrative purposes only. Thus, communication networks 10 suitable for configuration according to the present embodiments may comprise more or fewer components, or in some cases, components that are different than those illustrated in FIG. 1. Additionally, it should be noted that the present embodiments are described in the context of regression testing the functions of an application program having new or modified program code. However, the specific mention of any type of testing or feature is for illustrative purposes only. The present embodiments may be utilized to recommend other types of tests in addition to, or in lieu of, regression tests. Such tests include, but are not limited to, unit and system tests.

Network 10 comprises a packet-data network 12 that communicatively interconnects a control computer 20 with an Application Server (AS) 40 and a database (DB) server 50. Additionally, DB server 50 communicatively connects to a data storage device 52. Generally, application programs undergoing initial and/or regression testing execute on AS 40. As stated above, the application program includes an agent module that receives test commands from a user of the control computer 20. The commands may be sent from a GUI executing at control computer 20 during the initial testing of the program. The agent module extracts the data, and communicates the data to a database program (e.g., DB2, ORACLE, and the like) executing on DB server 50 to store data to storage device 52.

Thereafter, control computer 20 receives a message indicating that the program code of the application has been modified. The message may identify, for example, the particular names (e.g., the URIs) of one or more methods that were modified or added to the program code. In response, control computer 20 invokes a recommendation engine to retrieve and analyze the data previously stored by the agent module in storage device 52. Based on that analysis, the recommendation engine identifies a selected set of regression tests for presentation to the user. The selected set of regression tests may also be optimized and prioritized by control computer 20 to ensure that only the necessary number and types of tests are selected to fully regression test the program code.

Figure 2:
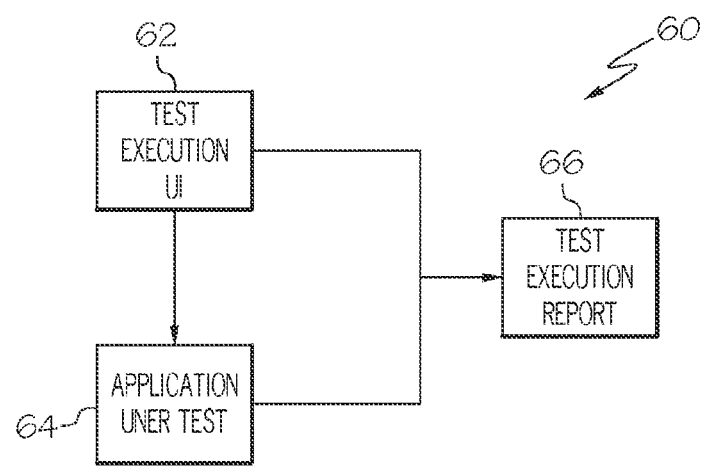
FIG. 2 is a functional block diagram illustrating some functional components used for regression testing an application program according to the prior art.

FIG. 2 illustrates an architecture 60 of some components used for regression testing an application program according to the prior art. As seen in FIG. 2, prior art architectures 60 comprise a test execution UI 62 executing on a computing device. Generally, the UI 62 is used to send commands to the application program 64 under test. Those of ordinary skill in the art will appreciate that the test execution UI 62 and the application program 64 are themselves application programs that may be executed on the same computing device, or on different computing devices.

At any rate, a user, such as a developer or tester, for example, would select one or more tests to execute using UI 62. Each of the selected tests may comprise, for example, one or more executable scripts that, when executed by a microprocessor on a target computer, exercise specific functions of the application program 64. By way of example only, a first test may cause the application program 64 to perform the functions needed to add an employee record to a database. A second test may cause application program 64 to delete the employee record from the database. Still other tests may exercise the application program 64 to modify records, generate reports, perform monitoring functions, and the like. Regardless of the specific test, however, the results of each test are usually output by one or both of the UI 62 and the application program 64, in a test execution report 66 to a user. Based on the results contained in such reports, the user can determine whether a test passed or failed.

Such prior art methods and architectures are not optimal, however, for regression testing. As stated previously, test teams generally select and execute tests to test a new or modified feature of a modified application program without fully appreciating the total impact that a given code modification may have on the rest of the features of application program 64. This may cause the testers to select and execute too many tests, too few tests, or the wrong tests, to regression test application 64. Therefore, embodiments of the present disclosure provide a method for storing information about tests that are conducted on an application program, and then intelligently selecting certain tests for regression testing the application responsive to being notified that certain portions of the application program have been changed.

Figure 3:
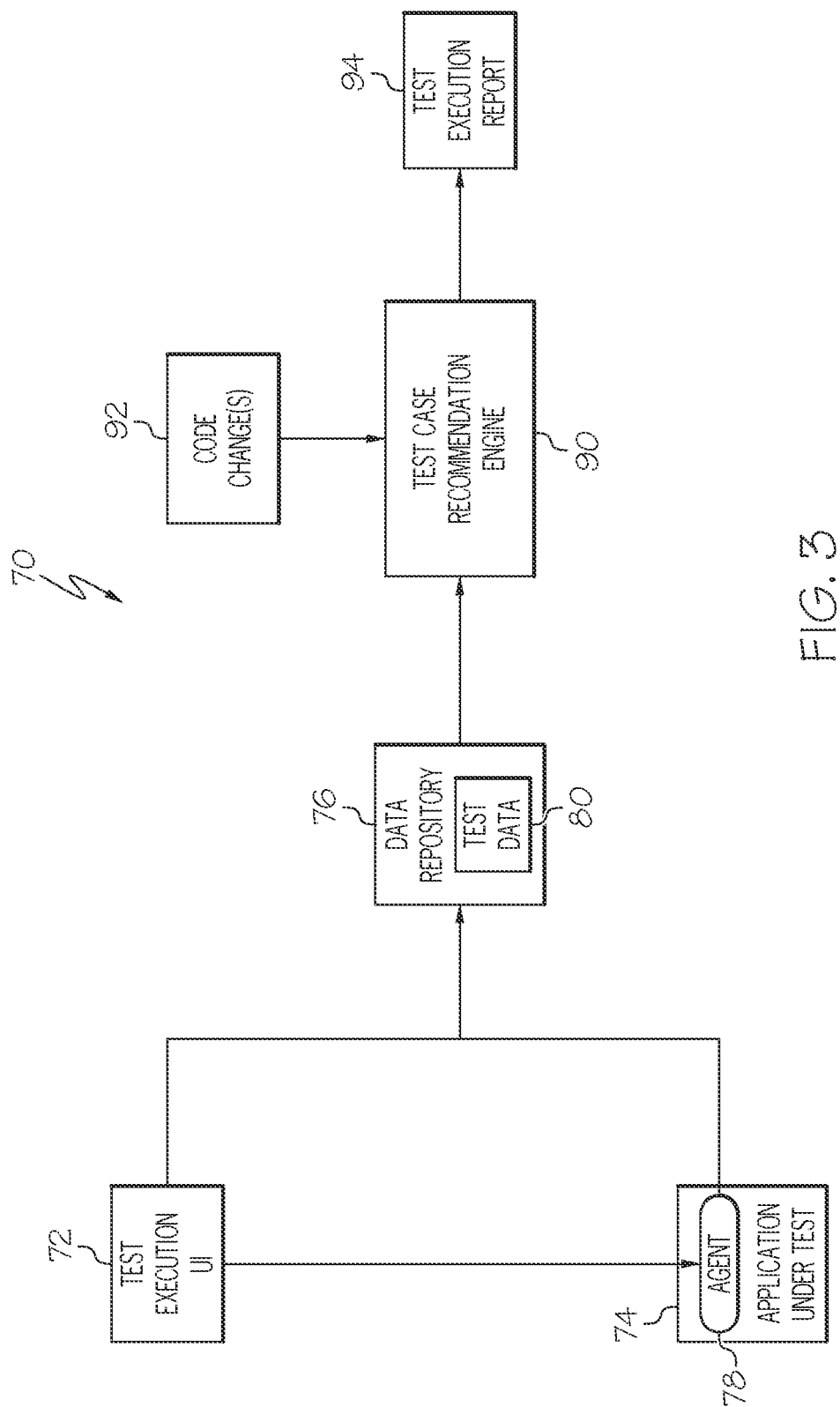
FIG. 3 is a functional block diagram illustrating some functional components used for regression testing an application program according to one embodiment of the present disclosure.

FIG. 3 illustrates an architecture 70 comprising components utilized to select and execute regression tests according to embodiments of the present disclosure. In this embodiment, architecture 70 comprises a test execution UI 72, an application program 74 to be tested, a data repository 76, and a test recommendation engine 90.

In this embodiment, the test execution UI 72 comprises a graphical user interface (GUI) that graphically displays control components to a user. Such components include, but are not limited to, buttons, lists, and in some cases, text entry fields, that allow the user to select, execute, and control certain desired tests for regression testing application program 74. For example, FIG. 4A illustrates an exemplary GUI 100 which may be displayed to the user in one embodiment. As seen in FIG. 4A, the GUI 100 displays a test case ID 102 that identifies each particular test case, a unique title 104 for each test, and a selectable link 106 with which the user can control the execution of the test cases. For example, in this embodiment, the user simply selects or "clicks" on the "Start" link to begin the execution of a corresponding test case. Similarly, the user would simply select or click the "End" link to cease execution of the corresponding test case.

Of course, those of ordinary skill in the art will readily appreciate that GUI 100 may comprise other controls and/or display other information. In fact, UI 72 need not comprise a GUI 100 at all. In some embodiments, the test execution UI 72 comprises a simple command line interface that allows the user to enter various commands and parameters to control the UI 72 to display a list of test names, their titles, and their statuses, as well as to control their execution as previously described.

Returning to FIG. 3, the application program 74 is also written to comprise an agent module 78. While the agent module 78 is not germane to the operational functions and services performed by application program 74, it does operate during the testing phases of application program 74 specifically to capture and store the information that is later used by the recommendation engine 90 to recommend selected regression tests. More particularly, the agent module 78 intercepts the test commands issued by UI 72, and in some cases, the actual test scripts and/or data. Such interception initially occurs during the initial tests of application program 74, but may also occur throughout the life cycle of application program 74. Thus, the agent module 78 may perform its intended functions during regression testing as well. Upon intercepting the information, the agent module 78 correlates the information for later retrieval by the recommendation engine 90.

For example, as seen in FIGS. 4B-4C, the agent module 78 may extract information from the received commands and store it in one or more tables. A first table 110 (FIG. 4B) correlates the test case ID 112 to the title of the test 114. In addition, the status 116 of the test is monitored and tracked by the agent module 78, as is the start time 118 and the end time 120 of each test. This information, as well as other information needed or desired, is stored as the test data 80 in the data repository 76.

In addition to the information stored in table 130, the agent module 78 also extracts other information for storage as test data 80. As seen in FIG. 4C, for example, such information may also include a method ID 132 (e.g., an arbitrary integer value) that identifies a method or function that is part of the code of application program 74, the test case ID 134, the URI that identifies the name of the particular methods 136 being invoked by the application program 74 during testing, and the parameters 138 and their values that are passed to, or returned from, the invoked methods and functions. Additionally, in some embodiments, a parent ID 140 is maintained for each "child" method that identifies which of the methods is its parent. This information is used, as described in more detail below, in developing a recommendation on which tests to run for regression testing application program 74, as well as to prioritize and optimize the tests Returning to FIG. 3, the architecture further comprises the test recommendation engine 90. As seen in this figure, the test recommendation engine 90 communicates with an application or other entity that informs the recommendation engine 90 of any changes 94 that are made to the code of application program 74. The notifications may be sent by an application associated with a code repository, for example, and may comprise a list of URIs indicating which methods in the application program 74 were added, deleted, or modified. Regardless of how the notifications are sent, however, the test recommendation engine 90 retrieves test data 80 from the data repository 76 responsive to the notifications (e.g., the data seen in the tables 130, 140 of FIGS. 4B-4C), and determines, based on an analysis of that retrieved data, which regression tests should be executed by the user to fully regression test application program 74 in light of the code changes. The recommended test cases, which may themselves be embodied as a list, for example, are then output in a test execution report 94 to a display device or printer, for example, so that the user may execute those particular tests.

Figure 5:
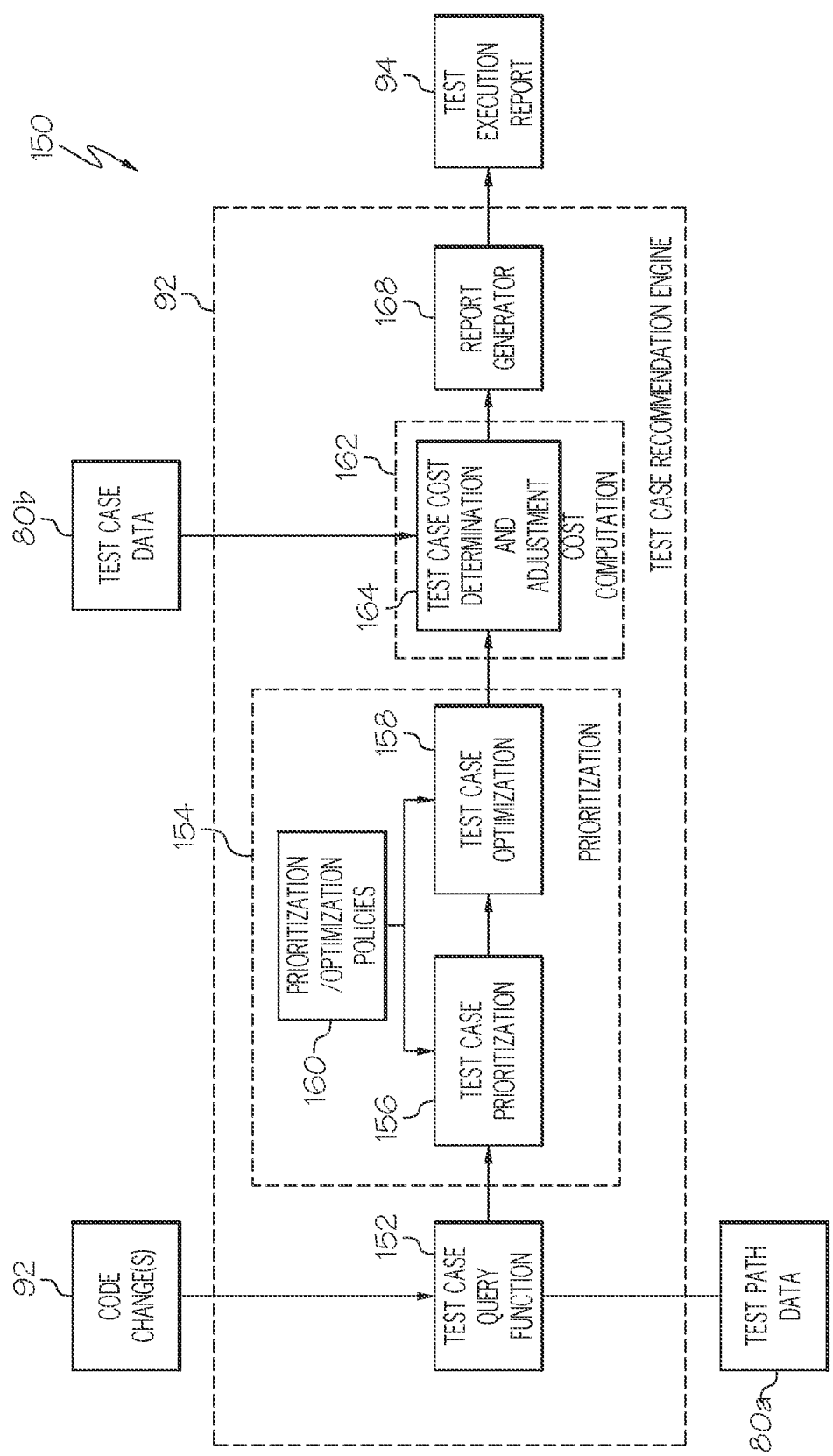
FIG. 5 is a functional block diagram illustrating a test case recommendation engine configured according to one embodiment of the present disclosure.

FIG. 5 is a functional block diagram illustrating a possible architecture 150 for the recommendation engine 90 according to one embodiment of the present disclosure. Particularly, the recommendation engine 90 comprises a test case query function 152, a prioritization function 154, a cost computation function 162, and the report generator function 168.

The test case query function 152 receives the indications of the code changes 92 from a code repository, for example. In response, test case query function 152 generates and sends a request message to retrieve test path data 80a from the data repository 78. In one embodiment, the test case query function 152 generates the request based on the particular changes that were made to the code. For example, the code changes 92 may comprise a list of URIs that uniquely identify corresponding methods or function names that have been modified by a developer. The request message could therefore include these URIs, for example, as well as any data or corresponding information illustrated in one or both of the tables 130, 140 of FIGS. 4B and 4C.

Upon receipt of the requested information, the query test case query function 152 will send or forward the retrieved information to the prioritization function 154 as a list. As seen in Figures, the prioritization function 154 comprises a test case prioritization module 156 and a test case optimization module 158 that prioritizes and optimizes the test cases according to one or more policies contained in a policy file 160. The priority and optimization policies contained in the policy file 160 may be defined by a user, for example, or may be defined as part of an initial provisioning exercise.

In one embodiment, the policy file 160 prioritizes the test cases received from the test case query function 152 according to their respective "hit-rate." A "hit-rate," as used herein, is a value (e.g., a counter) associated with each test case that indicates how often the test case was previously invoked. Upon receiving the test case information from the test case query function 152, the prioritization module 154 could generate an ordered list of test cases based on their respective hit-rates. Test cases having a high hit-rate would be deemed to impact a greater number of methods or functions of application program 74, and thus, may appear at the top of the list. Test cases having a lower hit-rate could be deemed to impact a fewer number of methods or functions of application program 74, and thus, could possibly appear at or near the bottom of the list.

Alternatively, or additionally, the policy file 160 may also define a threshold value for the hit-rate. In these cases, the prioritization module 154 could still generate an ordered list of test cases in accordance with the predefined hit-rate, but would only include test cases having a hit-rate that meets or exceeds the threshold value.

In addition to prioritization, the prioritization function 154 may also be configured to optimize the prioritized test cases. For example, upon receiving the ordered list of test cases from the prioritization module 156, the optimization module 158 will cull the list and remove any duplicate test cases. Additionally or alternatively, optimization module 158 may remove any test cases having a hit-rate that does not meet or exceed a threshold value defined in the policy file 160. Of course, other prioritization and optimization constraints may be implemented as needed or desired by updating, for example, the data and information defined in the policy file 160.

In addition, the cost computation function 162 comprises a cost determination and adjustment module 164 that computes the "cost" of executing one or more of the prioritized and optimized test cases. The cost of executing a given test case is based, for example, on the time it takes the test case to execute, as well as the resources needed or accessed by the test cases during execution. For example, test cases that take longer to execute and that control the application program 74 to invoke a relatively large number of API calls would be more "expensive" than other test cases that execute in a relatively short period of time or that do not cause the application program 74 to invoke a relatively large number of API calls. The information needed to compute the cost may be retrieved, for example, from the test case data 80b and/or from other sources as needed or desired. Regardless of the manner of cost computation, however, one embodiment of the cost determination and adjustment module 164 may further cull the list of prioritized and optimized test cases by keeping only those test cases that fall below a predefined cost threshold value on the list.

Once the cost is computed, the cost determination and adjustment module 164 outputs the list of test cases and their associated costs to the report generator 168. Upon receipt, the report generator formats the list to any desired format, and outputs the list in a test execution report 94 to the user. By way of example, the report generator 168 may output the list to a display device for the user, or to a printer for the user, or both. Regardless of how the list is presented to the user, however, the list of recommended test cases output by the report generator 168 ensures that that the user runs the fewest number of test cases during regression testing while still ensuring that the application program 74 is fully tested.

Figure 6:
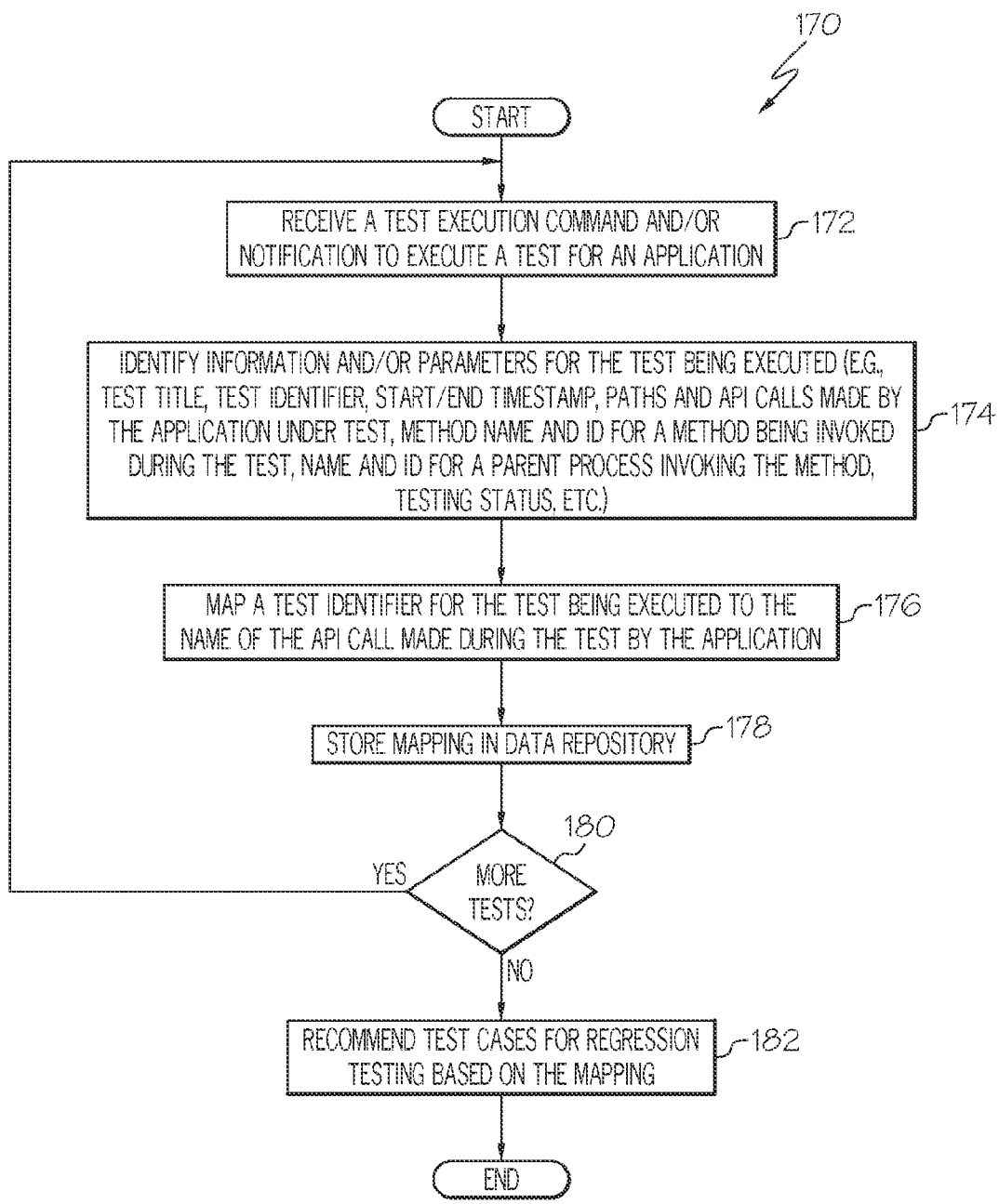
FIG. 6 is a flow diagram illustrating a method for capturing and storing the information needed in the recommendation of regression test cases according to one embodiment of the present disclosure.

FIG. 6 is a flow diagram illustrating a method 170 for recommending test cases to a user according to one embodiment. Method 170 begins with the agent module 78 in the application program 74 receiving a test execution command from the test execution UI 72 (box 172). As previously stated, the test execution command may comprise information and data that will be extracted by the agent module 78, such as the URIs of the methods and functions that will be invoked during execution, the parameters, timestamp values, and the like. The agent module 78 then identifies and extracts this information from the command (box 174), and maps the information to a test identifier associated with the particular test being executed. The agent module 78 also maps the test identifier for the test being executed to the URIs associated with the API method(s) invoked during the test (box 176), stores mappings in the data repository 76 as test data 80 (box 178), and repeats these functions for each test received command (box 180). Thereafter, the recommendation engine 90 can be controlled to analyze these mappings (e.g., the data seen in FIGS. 4B-4C) and to recommend test cases for regression testing based on those mappings (box 182).

Figure 7:
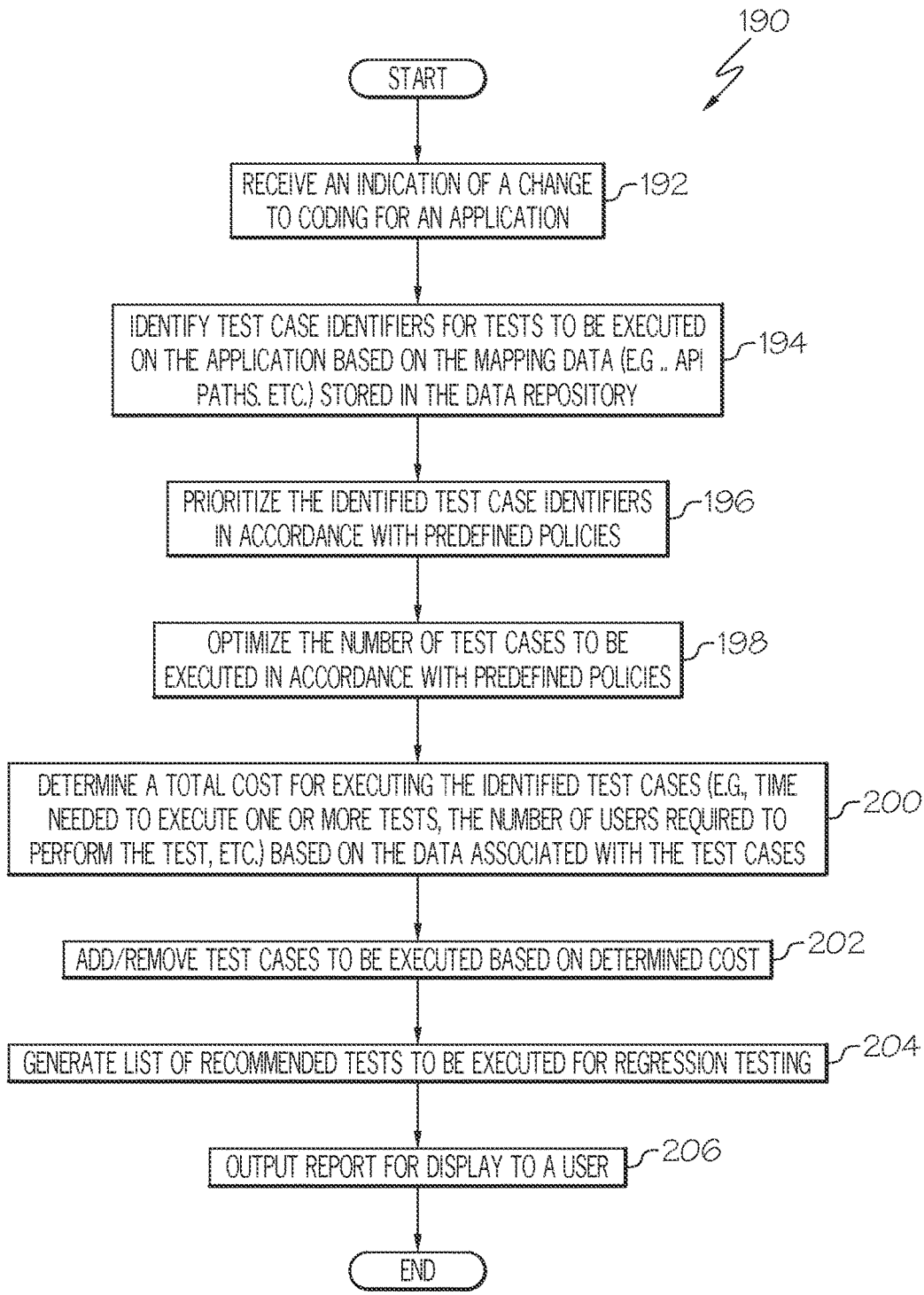
FIG. 7 is a flow diagram illustrating a method for recommending regression test cases according to one embodiment of the present disclosure.

FIG. 7 is a flow diagram illustrating a method 190 performed by the recommendation engine 90 for recommending a set of regression tests to a user according to one embodiment. Method 190 begins with recommendation engine 90 receiving an indication of a code change to application program 74 (box 192). The indication may comprise, for example, a message that includes a list of all the methods of application program 74 that were modified or changed. Upon receiving the indication, recommendation engine 90 determines the test case identifiers for each test to be executed on the application program 74 (box 194). This may be accomplished, for example, by the test case query function 152. Particularly, as stated above, the test case query function 152 first retrieves the data 80 (e.g., the data illustrated in FIGS. 4B-4C) from the data repository 78. The test case query function 152 then compares the method names (i.e., the URIs) received in the list to the method names (i.e., URIs) retrieved with the data 80. Based on the results of that comparison, the test case query function 152 can determine the particular test case IDs.

This may result, however, in a rather large number of tests. Therefore, the recommendation engine 90 prioritizes and optimizes the tests identified by the test case query function 152. As previously stated, the prioritization and optimization functions may be accomplished in accordance with the set of predetermined prioritization/optimization policies stored in the policy file 160 (boxes 196, 198). This may result in a fewer number of tests. The recommendation engine 90 then computes a cost for performing the tests, both individually and collectively, based on the data 80 associated with the test cases and retrieved by the test case query function 152 (box 200). Test cases that are deemed "too expensive" to execute in terms of time and resources, for example, may then be culled from the list by recommendation engine 92. Alternatively, or additionally, test cases that were previously culled from the list because they did not meet a priority or optimization threshold, for example, may be added back to the list based on the computed cost (box 202). The recommendation engine 90 then generates a final list of test cases (box 202), and outputs that list to a user (box 204). By way of example only, the report may be output to a display, or to a printer, or both. The user may then use this information to perform regression testing on the application program 74.

Figure 8:
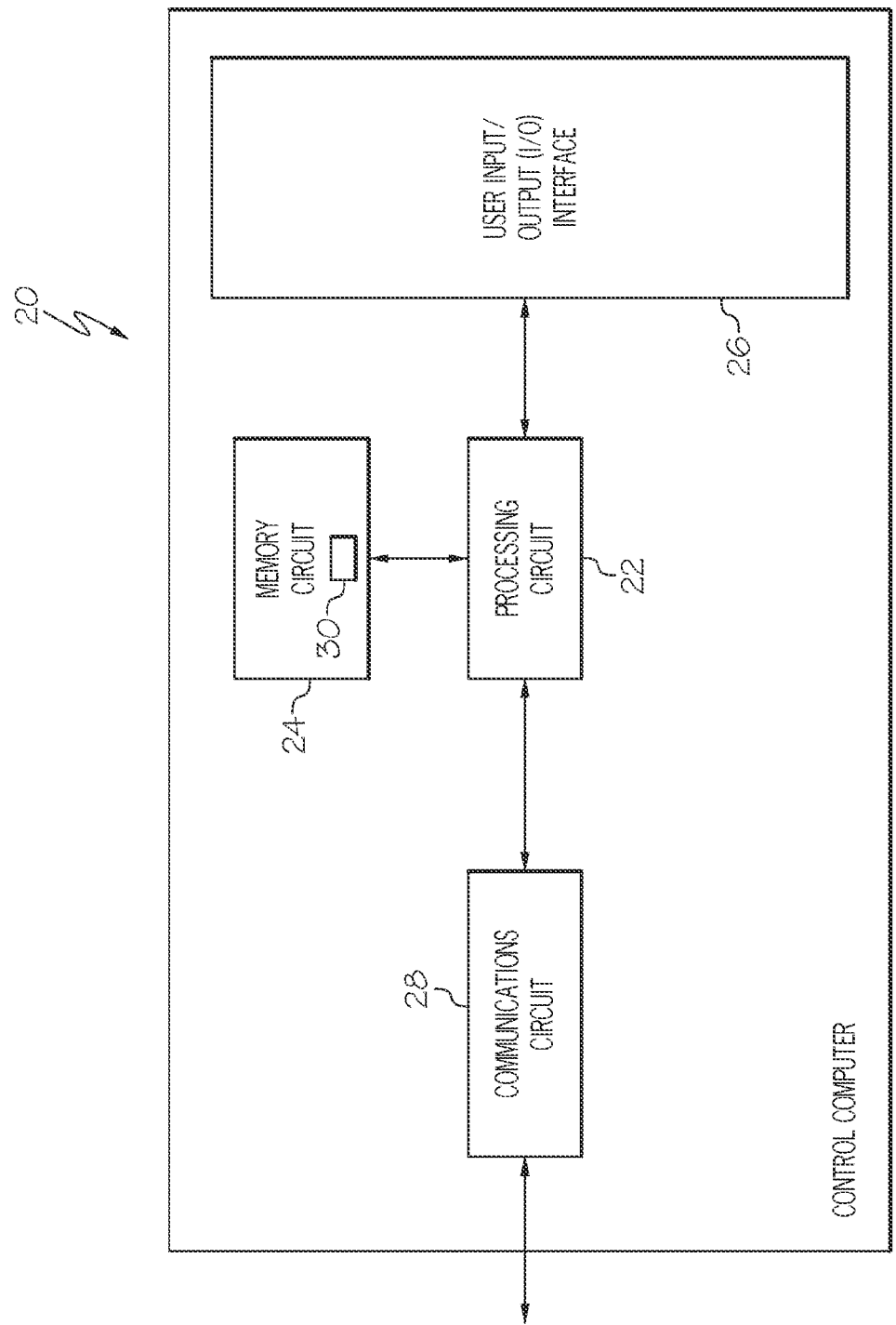
FIG. 8 is a functional block diagram illustrating circuitry of a computing device configured to capture and store information used in the selection of regression tests, and to recommend selected regression test cases according to one embodiment of the present disclosure.

FIG. 8 is a functional block diagram of control computer 20 configured to perform the embodiments of the present disclosure. As seen in FIG. 8, control computer 20 comprises, inter alia, a processing circuit 22, a memory circuit 24, a user Input/Output (I/O) interface 26, and a communications interface circuit 28. Those skilled in the art will readily appreciate that control computer 20 is not limited solely to the components seen in the figure, but rather, may comprise other hardware and/or software components as needed or desired.

Processing circuit 22 may be implemented by circuitry comprising one or more microprocessors, hardware, firmware, or a combination thereof. Generally, processing circuit 22 controls the operation and functions of the control computer 20 according to appropriate standards. Such operations and functions include, but are not limited to, communicating with other network devices, such as servers 40 and/or 50 via network 12.

Additionally, according to various embodiments of the present disclosure, processing circuit 22 is configured to receive messages indicating that the program code of an application program has been modified, and in response, execute the instructions of recommendation engine 90 to perform the functions previously described. To that end, the processing circuit 22 may be configured to implement a control program 30 stored in memory circuit 24 that comprises the logic and instructions needed to perform the method of the embodiments of the present disclosure as previously described.

Memory circuit 24 may comprise any non-transitory, solid state memory or computer readable storage media known in the art. Suitable examples of such media include, but are not limited to, ROM, DRAM, Flash, or a device capable of reading computer-readable storage media, such as optical or magnetic storage media. Memory circuit 24 stores programs and instructions, such as the control program 30 previously mentioned, that configures the processing circuit 22 to perform the method of the present disclosure as described in the previous embodiments. Additionally, memory circuit 24 may store one or more policy files, such as policy file 160, that are used by the processing circuit 22 to prioritize and optimize the test cases, as previously described. Such files may or may not be temporary, and may be created and maintained by a user as needed or desired.

The user I/O interface 26 comprises the hardware and software components necessary for a user to interact with control computer 20. Such components include, but are not limited to, a display device that displays GUI 100 as previously described, a keyboard, a mouse, and any other input/output mechanisms that facilitate the user's ability to regression test application program 74 according to embodiments of the present disclosure.

The communications interface circuit 28 may comprise, for example, an I/O card or other interface circuit configured to communicate data and information with servers 40, 50 via network 12. As those of ordinary skill in the art will readily appreciate, the communications interface circuit 28 may communicate with these and other entities using any known protocol needed or desired. In one embodiment, however, communications interface circuit 28 sends data to and receives data from servers 40, 50 in data packets according to the well-known ETHERNET protocol. In this regard, communications interface circuit 28 may comprise an ETHERNET card.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   determining, by a processing circuit of a control computer, that program code in an application program has been modified;
   determining, by the processing circuit, a set of test cases for the application program based on a mapping of the program code that has been modified to an execution trace of the application program stored in a memory circuit, wherein the execution trace was captured during a prior execution of the set of test cases and comprises a plurality of method identifiers, wherein each method identifier is associated with:
      a method in a sequence of methods called by the program code prior to being modified;
      a test case identifier identifying a test case that was executed to test the method during the prior execution of the set of test cases; and
      a set of parameters associated with the test case and processed by the method during the execution of the test case identified by the test case identifier;
   determining an optimum number of test cases that will be required for the regression testing based on a similarity between the parameters associated with the test cases in the set of test cases;
   generating, by the processing circuit, a list of recommended test cases for regression testing the application program from the set of test cases to comprise the optimum number of test cases that will be required for the regression testing; and
   identifying, by the processing circuit, the list of recommended test cases to a user.

2. The computer-implemented method of claim 1 wherein determining, by a processing circuit of a control computer, that program code in an application program has been modified comprises receiving an indication identifying which methods in the program code were modified.

3. The computer-implemented method of claim 2 wherein determining, by the processing circuit, a set of test cases for the application program based on a mapping of the program code that has been modified to an execution trace of the application program stored in a memory circuit comprises:

determining whether a method that was modified is in the sequence of methods of the execution trace; and if the method is in the sequence of methods, including the test case identifier associated with the sequence of methods in the set of test cases.

4. The computer-implemented method of claim 1 further comprising:

prioritizing each test case in the set of test cases according to a predefined prioritization policy; and generating the list of recommended test cases for regression testing the application program based on a priority of each test case.

5. The computer-implemented method of claim 4 wherein prioritizing each test case in the set of test cases according to a predefined prioritization policy comprises prioritizing each test case according to a number of times the test case was invoked during the prior execution of the set of test cases.

6. The computer-implemented method of claim 1 further comprising:

calculating a performance cost of executing each test case in the set of test cases; and wherein generating the list of recommended test cases for regression testing the application program comprises adding test cases to, or deleting test cases from, the list of recommended test cases based on the calculated performance cost.

7. The computer-implemented method of claim 1 wherein identifying, by the processing circuit, the list of recommended test cases to a user comprises identifying a test script for each test case in the list of recommended test cases to the user.

8. The computer-implemented method of claim 1 wherein generating, by the processing circuit, a list of recommended test cases for regression testing the application program from the set of test cases comprises generating the list of recommended test cases based on a priority assigned to each test case, and on a calculated performance cost of executing each test case.

9. A computing device comprising:

a communications interface circuit configured to communicate data with a remote computing device via a communications network; and a processing circuit configured to:

determine that program code in an application program has been modified;

determine a set of test cases for the application program based on a mapping of the program code that has been modified to an execution trace of the application program stored in a memory circuit, wherein the execution trace was captured during a prior execution of the set of test cases and comprises a plurality of method identifiers, wherein each method identifier is associated with:

a method in a sequence of methods called by the program code prior to being modified;

a test case identifier identifying a test case that was executed during the prior execution of the set of test cases; and a set of parameters processed by the method during the execution of the test case identified by the test case identifier;

determine an optimum number of test cases that will be required for the regression testing based on a similarity between the parameters associated with the test cases in the set of test cases;

generate a list of recommended test cases for regression testing the application program from the set of test cases to comprise the optimum number of test cases that will be required for the regression testing; and identify the list of recommended test cases to a user.

10. The computing device of claim 9 wherein the processing circuit is further configured to receive an indication identifying which methods in the program code were modified.

11. The computing device of claim 10 wherein the processing circuit is further configured to:

determine whether a method that was modified is in the sequence of methods of the execution trace; and if the method is in the sequence of methods, include the test case identifier associated with the sequence of methods in the set of test cases.

12. The computing device of claim 9 wherein the processing circuit is further configured to:

prioritize each test case in the set of test cases according to a predefined prioritization policy; and generate the list of recommended test cases for regression testing the application program based on a priority of each test case.

13. The computing device of claim 12 wherein the processing circuit is further configured to prioritize each test case according to a number of times the test case was invoked during the prior execution of the set of test cases.

14. The computing device of claim 9 wherein the processing circuit is further configured to:

calculate a performance cost of executing each test case in the set of test cases; and add test cases to, or delete test cases from, the list of recommended test cases based on the calculated performance cost.

15. The computing device of claim 9 wherein the processing circuit is further configured to generate the list of recommended test cases based on a priority assigned to each test case, and on a calculated performance cost of executing each test case.

16. A non-transitory computer-readable storage medium comprising executable code stored thereon that, when executed by a processing circuit of a computing device, configures the computing device to:

determine that program code in an application program has been modified;

determine a set of test cases for the application program based on a mapping of the program code that has been modified to an execution trace of the application program stored in a memory circuit, wherein the execution trace was captured during a prior execution of the set of test cases and comprises a plurality of method identifiers, wherein each method identifier is associated with:

a method in a sequence of methods called by the program code prior to being modified;

a test case identifier identifying a test case that was executed during the prior execution of the set of test cases; and a set of parameters processed by the method during the execution of the test case identified by the test case identifier;

determining an optimum number of test cases that will be required for the regression testing based on a similarity between the parameters associated with the test cases in the set of test cases;

generate a list of recommended test cases for regression testing the application program from the set of test cases to comprise the optimum number of test cases that will be required for the regression testing; and identify the list of recommended test cases to a user.

17. The computer-implemented method of claim 8 wherein generating the list of recommended test cases based on a priority assigned to each test case, and on a calculated performance cost of executing each test case, comprises generating the list of recommended test cases to include:
    test cases having a hit-rate that meets or exceeds a predetermined hit-rate threshold; and
    test cases having a calculated performance cost that is lower than a predetermined performance cost threshold.

* * * * *